US010599542B2

(12) United States Patent
Lenart et al.

(10) Patent No.: US 10,599,542 B2
(45) Date of Patent: *Mar. 24, 2020

(54) DEVICE CONFIGURATION WITH CACHED PRE-ASSEMBLED DRIVER STATE

(71) Applicant: Microsoft Technology Licensing, LLC, Redmond, WA (US)

(72) Inventors: Adam J. Lenart, Seattle, WA (US); James G. Cavalaris, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,744

(22) Filed: Jan. 7, 2019

(65) Prior Publication Data

US 2019/0138417 A1 May 9, 2019

Related U.S. Application Data

(63) Continuation of application No. 15/372,103, filed on Dec. 7, 2016, now Pat. No. 10,176,072, which is a continuation of application No. 13/315,945, filed on Dec. 9, 2011, now Pat. No. 9,547,499.

(51) Int. Cl.
*G06F 11/30* (2006.01)
*G06F 9/4401* (2018.01)

(52) U.S. Cl.
CPC ........ *G06F 11/3051* (2013.01); *G06F 9/4411* (2013.01); *G06F 11/3037* (2013.01)

(58) Field of Classification Search
CPC . G06F 9/4411; G06F 11/3051; G06F 11/3037
See application file for complete search history.

(56) References Cited

U.S. PATENT DOCUMENTS 9,547,499 B2 * 1/2017 Lenart ................... G06F 9/4411
10,176,072 B2 * 1/2019 Lenart ................... G06F 9/4411

* cited by examiner

*Primary Examiner* — Henry Tsai
*Assistant Examiner* — John B Roche
(74) *Attorney, Agent, or Firm* — Davin Chin; Chin IP, PLLC (57) ABSTRACT

A computer with cached pre-assembled device configurations for a faster and more reliable user experience. Pre-assembled device configurations may be obtained in a variety of ways, for example, by pre-processing installation information obtained from driver packages, or by being retrieved from a suitable source. Pre-processing driver packages may involve, for example, copying binary files to their run-time locations and computing settings for the device and driver. The pre-processed device configuration settings may be cached and indexed in a database. When a device connects to the computer, a cached device configuration may be applied to the device without performing a full installation process. Pre-assembly of device configurations may be performed before a device first connects to the computer, for example, upon detecting an applicable driver or during manufacture of the computer, and is not restricted to being performed on the same computer on which the device configuration will be used.

20 Claims, 5 Drawing Sheets

DEVICE CONFIGURATION WITH CACHED PRE-ASSEMBLED DRIVER STATE

CROSS-REFERENCE TO RELATED APPLICATION(S)

This application is a continuation of U.S. patent application Ser. No. 15/372,103, filed Dec. 7, 2016, entitled "DEVICE CONFIGURATION WITH CACHED PRE-ASSEMBLED DRIVER STATE," which is a continuation of U.S. patent application Ser. No. 13/315,945, filed Dec. 9, 2011 entitled "DEVICE CONFIGURATION WITH CACHED PRE-ASSEMBLED DRIVER STATE," now U.S. Pat. No. 9,547,499 issued Jan. 17, 2017. The entirety of each of these afore-mentioned application(s) is incorporated herein by reference.

BACKGROUND

There are numerous varieties of devices that may connect and interoperate with a computer. Such devices may be external to the computer, such as printers or music players, or may be internal, such as hard drives or network interface cards. In either case, before the device can be integrated and used in the computer, a process called "device installation" is performed. Device installation may involve, for example, installing a software component called a driver to allow the computer to interoperate with the device. The driver may be coded with instructions that control a device, or a family of related devices, and may provide an interface that may be accessed in a standard format through the operating system (OS) of the computer.

Though variations in the device installation process may be supported, for example through the use of plug-ins that hook predefined steps in the installation process, a typical device installation may include a sequence of steps, such as: (1) searching for and locating an appropriate driver, (2) installing the driver software, (3) starting the device or restarting the device if it was previously using a different driver, and (4) optionally performing any post-start installation actions.

This process of installing software for a driver may involve a number of complex and lengthy operations, including copying binary driver files to their runtime locations in the computer's memory, optionally pre-registering device input-output interfaces, and installing global device driver service state and per-instance device/driver configuration settings in a global configuration database, such as a registry. The device settings may include, for example, a baud rate for a modem or printing preferences for a printer. The driver software for a given device may be found in a variety of locations, either within the computer or outside of the computer, such as a portable memory device or a network location.

The information needed to install driver software for a device may be stored in a driver setup file. The driver setup file may be, for example, a script file, and may contain primitive operations that identify actions that the operating system is to perform to configure the computer for operation with the device and to configure the device to operate with the computer. To that end, a component in the operating system may monitor for a new hardware device physically connected to the computer. Once detected, the operating system may obtain various information, such as a set of device IDs, from the device. This identifying information can then be used to locate an appropriate driver setup file, from which software and settings for the driver and device are identified and loaded.

The settings and configuration for a particular device may be stored in a software construct called a "device instance," which may be an abstract representation of the device within the computer's operating system. The device instance may be a control structure that stores configuration or settings specific to the device, and may be encoded in a format that is accessible by the driver, which in turns interacts with the operating system of the computer. Therefore, each distinct device, and an associated device instance, is independently configured. If the same device is subsequently connected to the computer, then that device instance may be used by the driver to interact with the device.

Some operating systems can support automatically performing various steps of the device installation process after detecting a device. As an example, the WINDOWS® operating system supports the PLUG AND PLAY® functionality. With this functionality, when a device with PLUG AND PLAY® functionality is connected to a computer, the operating system automatically associates the device with a device instance and begins performing the numerous steps in the device installation process. These steps take place once for each device, after it has been connected to the system.

In addition, if the device is "boot-critical" because it contains functionality important to starting the operating system, then the device installation process may prepare minimal configuration settings that can be applied to similar device instances during future attempts to boot the system solely for the purpose of starting those devices so that they can potentially assist in booting the system. Once such a future boot device has used the minimal set of configuration settings during system boot time, any further required device installation operations can be carried out on this device under the fully booted OS runtime environment in order to complete and finalize its configuration.

SUMMARY

In computing environments in which a computer interoperates with a device, improvement is achieved by using pre-assembled device configurations. The pre-assembled device configurations may be obtained in any suitable manner. In some embodiments, a device configuration may be pre-processed by the operating system of the computer based on driver information obtained from, for example, driver packages and/or driver setup files, such as script files. Alternatively, or additionally, the device configuration may be generated outside of the computer, and may be stored, for example, in a pre-assembled driver package or in any suitable data structure accessible by the computer. Regardless of where and how a device configuration is pre-assembled, the device configuration may be used to configure one or more device instances as they are detected and enumerated by the computer. Alternatively or additionally, pre-assembly may entail loading executable code or otherwise adjusting the state of the computer to facilitate operation with the device, once it is detected as physically connected to the computer.

In some embodiments, pre-assembly of device configurations may be performed in response to any suitable trigger. If the computer pre-processes device configuration data from driver information, then the pre-processing may include detection of a driver package loaded onto the computer. In some embodiments, pre-configuration is performed for only certain types of devices, and those devices may be identified using information that may indicate a likelihood that such a device will eventually be connected to the computer. Such information may be based on functionality of the device and/or other information, such as the nature of applications or other components loaded on the computer.

In some embodiments, such information may also be based on a hardware configuration of the computer, such as may be known to a manufacturer of the computer, allowing the manufacturer to cache pre-processed device configuration data in anticipation of associated device hardware being detected. Accordingly, in some aspects, the invention may relate to a method of manufacturing a computer in which pre-processed device configuration data is pre-stored. The pre-processed device configuration data may also be stored as part of an image of an operating system such that when that image is loaded onto a computer, the computer pre-processes and caches device configuration data for one or more devices that may be used with the computer.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that a faster and more robust experience may be provided for users of computers by pre-storing pre-assembled device configuration data for a device that may be connected to the computer. The pre-assembled device configuration may be stored when driver information for the device is detected or in response to some other indication that a device may be installed at a later time. When a device is subsequently connected to the computer, the pre-stored configuration data may be used to expedite the device installation process.

Though various techniques of device installation are known, those techniques often require complex user-mode operations after detecting a device, which requires a significant amount of online processing and delays the device from being fully functional for the operating system and its users. Furthermore, the numerous and lengthy operations expose numerous potential points of failure, such that if any one of those operations fails, then the entire configuration process may be rendered unsuccessful. For example, the operating system may be unable to copy a file, or may run out of disk space, or may encounter other problems during the installation process. For a user of the computer, such disruptions may impair the usability of the computer.

The inventors have recognized and appreciated that the speed and robustness of using a computer may be improved by pre-configuring devices for use, before they connect to the computer. In some embodiments, device pre-configuration may include pre-processing device installation procedures and caching pre-processed device configuration for fast lookup. As such, when a device first connects to the computer, an appropriate pre-processed device configuration may be retrieved and copied to the device instance of the device, without having to perform many of the steps of the full device installation process. Alternatively, device configurations may be generated in other suitable ways, some of which may not involve any pre-processing by the computer on which they are deployed. For example, device configurations may be obtained or built without any form of pre-processing, such that they are in a state ready to be applied to a device that connects to the computer.

A computer may pre-install multiple drivers and pre-cache the resulting pre-processed device configurations in a separate device configuration database. In some embodiments, the device configuration database may be a repository of pre-processed device configurations for devices that may connect with the computer. The device configuration database may be a portion of, or indexed in, a global configuration database, such as a registry. In embodiments in which the system registry is pre-loaded by the OS boot loader, the device configuration database may be available through the registry during the early stages of booting the OS kernel so that boot devices may be fully configured and started in a timely fashion, before entering user-mode, where such a device itself may be required fully functional in order to boot the system into user-mode.

In some embodiments, when installation of a device requires a driver or other software to be installed, device pre-configuration may include loading that software such that executable code may be readily available in a location from which it will be accessed. As other examples, settings in a global configuration database, such as a registry, that associate the driver with the device or otherwise configure the computer to interact with the device, may be modified and saved.

The device pre-configuration process may use information obtained from any suitable source. However, in some embodiments the information is stored in driver packages. In some embodiments, such driver packages may contains various files, such as script files, which may specify instructions for installing drivers. The driver packages may be stored in various memory locations, inside or outside the computer. Regardless of how driver installation information is obtained, it may consist of instructions for installing and configuring one or more drivers for an associated device or devices. Such information may comprise, among other things, operations that change global system state and/or information relative to the device being installed.

Regardless of the exact nature of the device pre-configuration process, various operations related to device installation may be done before the device is actually detected as being connected to the computer. When the device is later connected, a user of the computer can more quickly access the device. Pre-configuration also may allow a computer to more quickly boot, if the pre-configured devices are boot-critical to the computer such that they are installed as part of the boot process.

In some embodiments, the system may selectively prepare pre-processed device configurations for devices. Any suitable criteria may be used to determine whether to pre-process information for a device. In some embodiments, information for a device may be selectively pre-processed based on the likelihood that the device will be connected to the computer. For example, the computer may detect driver packages stored in the computer, and/or the computer may be configured to pre-process information for drivers associated with commonly used devices. The commonly used devices may be identified in any suitable way, for example, by using information provided by the computer manufacturer or third-party driver manufacturers.

As another example, in some embodiments, device pre-configuration may be performed by manufacturers of computers, during installation of an operating system on a computer before the computer is shipped to an end user. The manufacturer may have knowledge of specific devices that will be installed on the computer and may therefore select devices for which the computer is to be pre-configured.

Alternatively or in addition, device configuration information may be pre-processed and stored as part of an image of an operating system, which may be deployed to users for installation on a computer. In some embodiments, an OS image may be created to include a cache of configuration information for certain devices and may include code for drivers in designated locations for the selected devices. When the image of the operating system is loaded on a computer, device pre-configuration may be provided by the operating system, such that a user of the computer may have available ready-to-apply pre-processed device configurations upon first using the operating system.

Applying the pre-processed device configuration to a device may be done in a variety of suitable ways. For example, in some embodiments, applying the device configuration may comprise copying configuration settings to a driver instance. Alternatively, it may comprise binding the configuration to a device instance without any copying or cloning, allowing the device instance to override or overlay some of the device configuration settings while keeping the original device configuration within the driver database unchanged.

Regardless of when and how device configurations are pre-processed and applied to devices, and for which devices this is performed, a computer deployed in this way could be of particular value in improving the experience of using the computer by giving users a feeling that the computer is very responsive to their newly connected devices or quickly boots, ready to operate with connected devices for the first time. Furthermore, simplifying the process of device installation creates fewer potential points of failure while booting the operating system or connecting a device, thus improving the feeling of robustness for a user of the operating system.

This pre-processing may detach the time-consuming installation of drivers from the time-sensitive first-time device connection. As such, a user of the computer may not need to endure the numerous complex steps of driver installation each time a new applicable device is connected to the computer, nor when booting a computer with boot-critical devices. By pre-configuring devices, if something fails during the device installation process, then the operating system is able to detect the problems ahead of time, and may attempt to resolve the problems before the user even needs to use the device.

Reducing delays and the likelihood of errors when a device is connected to a computer may make the new device feel more appliance-like in that the device is immediately available for use as if it had been attached to the computer before and already configured for use. Due to the simplicity of actually applying or copying a pre-configured pre-processed device configuration to a new device, in some embodiments, the pre-processed device configuration can be applied during the early phase of boot when the computing environment is inherently simplistic.

Pre-configuring may also support functionality not supported in a computer that uses a conventional device configuration process. For example, a boot environment may not support techniques to perform driver ranking and matching during selection of an applicable driver for a given device. Such ranking and matching schemes may depend on, for example, device feature classification or policy-enforced measures of driver quality. While such known techniques may only accurately execute on a computer once user-mode has been initialized, the device pre-configuration process may pre-process such ranking and matching techniques to provide the most appropriate driver even in the earliest phase of boot.

By using pre-configured information, a device installed during booting of the computer may be fully configured the first time and not require any further processing once user-mode is fully initialized. This may reduce the setup time of the operating system when booting and may also require fewer reboots than devices started with incomplete settings and unable to be restarted within the same boot session.

In some embodiments, the device pre-configuration process may install different drivers differently, depending on the content of the driver packages and other components in the operating system. For example, the pre-configuration process may only pre-process driver packages that are declaratively defined, while ignoring or blocking installation instructions that are non-declarative. Non-declarative instructions may be instructions that, among other things, cannot be equivalently replaced by their final result.

For example, non-declarative instructions may exist in driver packages due to third-party plug-ins that may arbitrarily modify and override any of the steps of driver installation defined in the driver packages. If a driver package contains non-declarative instructions, then pre-processing the driver package once and using the resulting pre-processed device configuration thereafter may yield different results, in terms of system state or other settings, than real-time processing of all the steps in the driver package each time a device is connected.

Figure 1A:
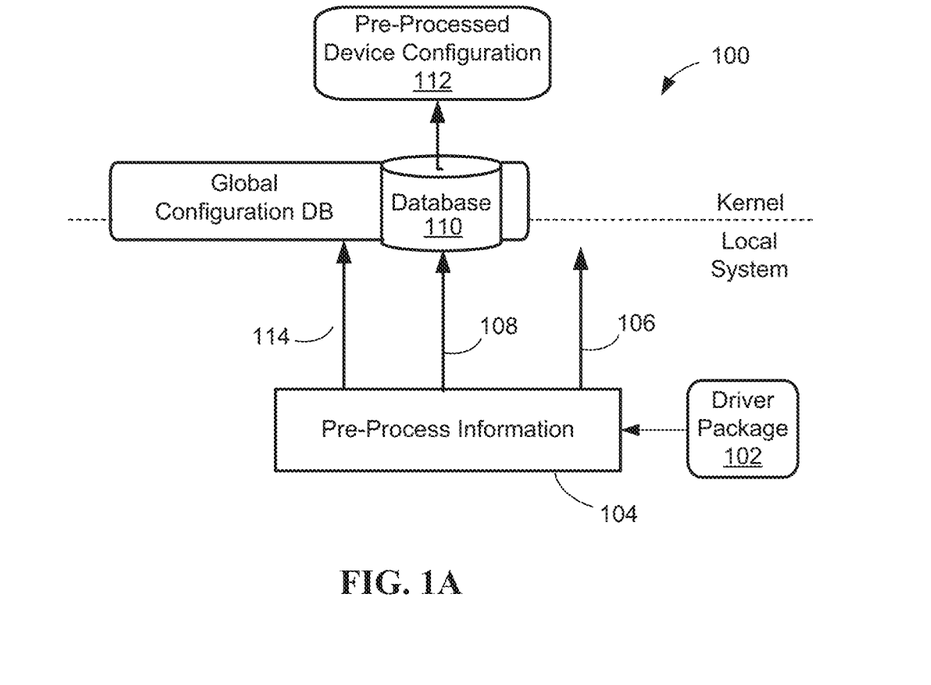
FIG. 1A is a schematic illustration of one possible embodiment of a method of generating pre-processed device configuration data from driver information.

Turning now to FIG. 1A, a schematic illustration is presented of one possible embodiment of a method of operating a computer to perform a device pre-configuration process 100. In some embodiments, this pre-configuration process 100 may pre-install drivers and initialize settings for a multitude of selected devices before those devices are ever connected to the computer. Regardless of the exact nature of this pre-configuration process 100, in some embodiments, the results of this pre-processing may be stored for fast lookup and retrieval when first connecting a new device or when booting an operating system with boot-critical, fully-configurable devices.

In some embodiments, the device pre-configuration process 100 may be associated with a driver and software for that driver. When connecting a new device for the first time, or when booting the operating system with devices that are installed during boot, the operating system may attempt to retrieve pre-processed device configuration data. One approach to retrieving that information is to search some data store to determine whether what is stored matches a driver that would have been selected by the device. If found in the store, the device may be installed using information that is pre-stored.

In some embodiments, the pre-configuration process 100 may involve copying driver software to its runtime location by using driver setup information, which may include instructions and settings for the operating system to install drivers. In some embodiments, this driver setup information may include a driver package 102, which may contain various text and/or binary executable files. Such files may include driver setup files, an example of which may be a script file or, in some embodiments, an INF file. Other files may provide an input-output interface for a device instance.

The driver package 102 may be obtained by any number of means, for example, by accessing a memory location inside the computer, or in an external memory location, such as a removable storage media or a network. Regardless of how the driver package 102 is obtained, in some embodiments, the driver package 102 may contain information representing driver information for one or more drivers that are associated with a plurality of devices, which may be from one or more distinct manufacturers. In some embodiments, finding a driver package 102 may trigger the pre-configuration process 100.

In some embodiments, the driver package 102 may be processed by a pre-processing module 104 to generate configuration information for devices associated with the driver package 102. For example, the pre-processing module 104 may install and copy information in step 106, such as binary files for a driver or services, into their appropriate run-time locations in memory. In some embodiments, however, step 106 may be optional and some device configurations may not have associated binary driver files. The pre-processing module 104 may also store pre-processed configuration data in step 108 into a device configuration database 110. This data may be in the form of pre-processed device configuration data 112, which may be indexed for fast lookup in the database 110 and readily applied to applicable devices. Furthermore, the pre-processing module 104 may initialize settings for drivers and/or devices in step 114 into a global configuration database, such as a registry.

Regardless of the exact nature of this pre-processing module 104, in some embodiments, there may be provided, based upon driver information such as a driver package 102, the initialization of system state and storage of pre-processed settings and binary files. The result of this pre-processing may be that when the operating system detects a new device, it may simply retrieve a pre-processed device configuration 112 and copy the information to the device instance associated with the device.

Alternatively, the pre-configuration process 100 may skip some or all of the steps in the pre-processing module 104, and instead retrieve a pre-assembled device configuration 112 from an appropriate source, either inside or outside the computer. For example, a pre-assembled device configuration 112 may be provided directly by the driver package 102, or by any other suitable source. Regardless of how the pre-configuration process 100 obtains the pre-assembled device configuration 112, such pre-assembled settings may be stored and indexed in the database 110 such that they may be readily retrieved and used for devices that connect to the computer.

Figure 1B:
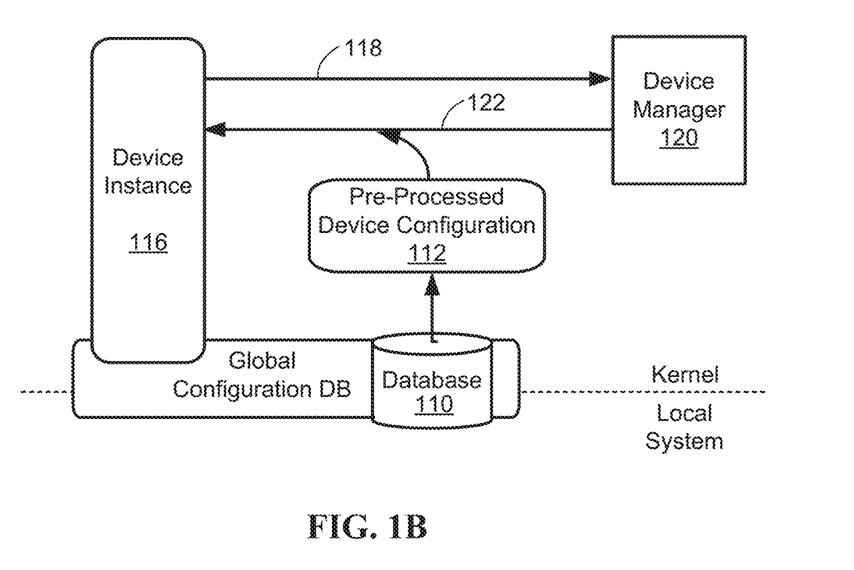
FIG. 1B is a schematic illustration of one possible embodiment of a method of installing a device connected to a computer by applying a pre-assembled device configuration to the device instance.

FIG. 1B shows a schematic illustration of one possible embodiment of a computer that may apply a pre-processed device configuration 112 to a new device connected to the computer. Upon detecting a new device connection, in some embodiments, the operating system may generate a software control structure representing the device, such as a device instance 116. A device instance 116 may be generated automatically using known techniques or may be generated in any suitable way. In some embodiments, the device instance 116 may store configuration or settings specific to the device. The actual "device" may be either a physical hardware device or a virtual device, but once connected to a computer, the device is abstracted in software as a device instance 116 that can bind to a driver, which in turn interacts with the operating system.

From the device instance 116, various information may be obtained in step 118 by device manager 120, such as device IDs and other information relative to the device. In some embodiments, the device manager 120 may be a kernel-mode device manager that controls the installation and operation of various devices. For example, the device manager 120 may be a PnP device manager, or alternatively any other component of the operating system that manages the installation and operation of one or more devices. Upon detecting an unconfigured device instance 116, the device manager 120 may attempt to configure the newly connected device.

To configure the device, in some embodiments, the device manager 120 may, as in step 122, search a database 110 for suitable pre-processed device configuration data 112. For example, this pre-processed device configuration 112 may in general be any information that comprises pre-processed settings related to the device instance 116 and associated drivers. After an applicable pre-processed device configuration 112 is retrieved from the database 110 and applied to the device instance 116, the device manager 120 may attempt to start the device instance 116 for use.

Figure 2:
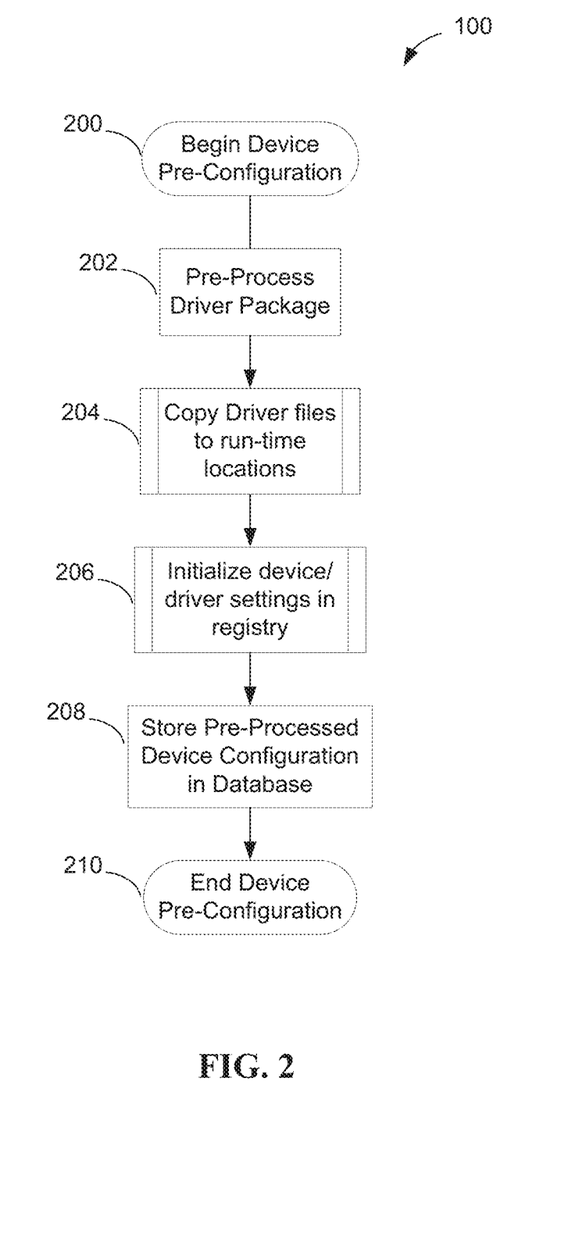
FIG. 2 is a flow chart of one possible embodiment of a method of pre-device configuration data from driver information, such as a driver package.

FIG. 2 is a flow chart of another possible embodiment of a method of performing the device pre-configuration 100. In step 200, the pre-configuration process 100 may begin for any number of reasons or in response to any suitable trigger. For example, pre-configuration may begin when a new driver package 102 is detected in the operating system, or when a new device is detected that has no applicable pre-processed device configuration 112 available in a device configuration database 110. In the latter case, the operating system may attempt to search for an applicable driver package 102 and, if found, perform the device pre-configuration process 100 using that newly-discovered driver package. In the case that pre-configuration information is stored when a device is detected, the pre-configuration information may then be used to install the device at that time or used later when a user seeks to access the device. Even when the device is to be installed when detected, there may be an advantage to storing the pre-configuration information in that other device instances may be populated with the stored pre-configuration information. However, it should be appreciated that the specific scenarios under which pre-configuration information is stored are not critical to the invention.

In general, driver installation information may be obtained in any suitable form, with the driver package 102 being just one possible embodiment. Furthermore, the driver package 102 may be obtained from a variety of locations, for example a memory location in the computer, which may be a repository of installable original equipment manufacturer (OEM) driver information, as is known in the art. Alternatively or additionally, the driver package 102 may obtained from a memory location in a removable storage medium, or in another computer or a network of computers, all of which may be searched to find an applicable driver package 102 for the device.

Regardless of how the operating system searches for a driver package 102, in step 202, the operating system may begin pre-processing the driver package 102. In some embodiments, the pre-processing of a driver package 102 may comprise one or more sub-processes. For example, sub-process 204 may comprise pre-copying binary files for drivers to their run-time locations in a memory location of the computer. Such binary files may include executable instructions to be invoked by the operating system to control or interact with a device once the device is connected to the computer. Alternatively or additionally to sub-process 204, sub-process 206 may install global device driver service state and per-instance device/driver configuration settings. Furthermore, in some embodiments, alternatively or additionally to sub-processes 204 and 206, the operating system may optionally pre-register device interfaces and/or pre-install function driver and optional filter driver services into a memory location. The sub-processes 204 and 206 may be performed in any suitable way, including using techniques as are known in the art for processing a driver package to install a device when the device is detected.

Regardless of the exact nature of the pre-processing of the driver package, however, various settings and states of the system may be altered in preparation for installing a device associated with the device instance 116. As such, in some embodiments, there may be provided, in step 208, a pre-processed device configuration such as pre-processed device configuration 112 in FIG. 1. This pre-processed device configuration 112 may contain, for example, settings and information that may be readily applied to a device instance 116 for a new device that later connects to the computer.

In some embodiments, in step 208, the pre-processed device configuration 112 may be stored in a database, such as device configuration database 110 in FIG. 1. Each entry of this device configuration database 110 may include, among other information, driver package version information, device hardware applicability mappings, and pre-configured device and driver settings. Regardless of the exact nature of pre-processed information from the driver package 102 that is stored in the device configuration database 110, connections of devices that use the same driver may retrieve and apply, for purposes of installation, information and settings directly from such a database 110, without having to repeatedly perform the same steps for every new device instance. After step 208, device pre-configuration ends at 210.

The pre-processed device configuration data may be stored in any suitable format. In some embodiments, the data may be formatted in accordance with a template that matches a format of a device instance into which the data would be loaded during a conventional device installation processing. Such a format may simplify the extraction of information from the driver package because the same processing steps may be used regardless of whether the generated data will be targeted for the device instance or for the template. Such processing may also simplify completing the installation from the pre-configured data because the data can be simply copied from the cache to the device instance. However, the specific format used for the pre-processed device configuration data 112 is not critical to the invention.

In some embodiments, the pre-processed device configuration data 112 stored in the device configuration database 110 may be indexed for quick lookup and comparison against other applicable devices using any suitable information indicating a type of device to which the pre-processed device configuration 112 is applicable. An index in any suitable form may be used and may itself be stored in any suitable location. In some embodiments, the index may be a part of a global configuration database, such as a registry. Regardless of how the device configuration database 110 is configured and organized, there may be provided global and per-instance driver configuration state and settings for immediate usage by devices.

Figure 3:
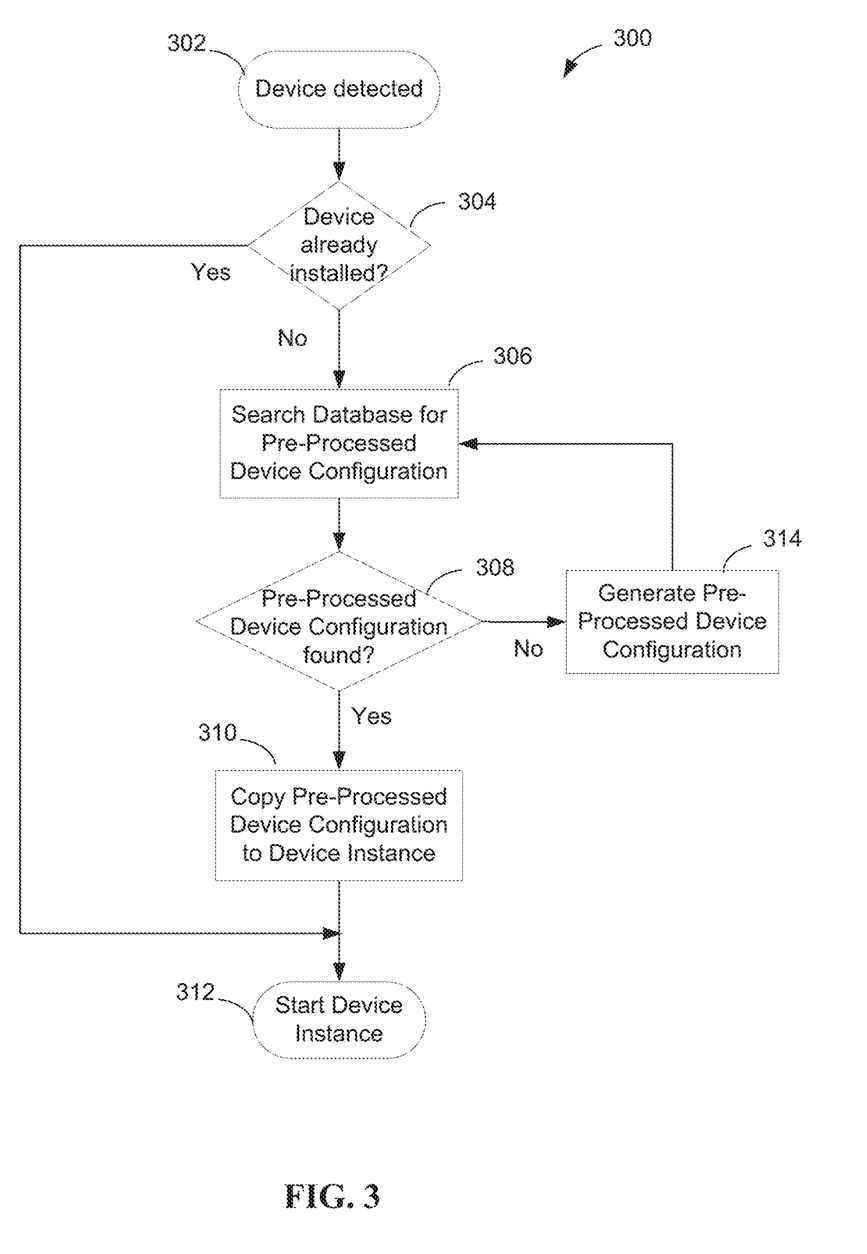
FIG. 3 is a flow chart of one possible embodiment of a method of installing a device connected to a computer by applying a pre-processed device configuration to the device instance when the device configuration is already cached on the computer, or generating the pre-processed device configuration from some driver information in response to the device being installed and then caching it for use by this device and any other devices like it that might be connected to the computer in the future

FIG. 3 is a flow chart of an exemplary embodiment of a method 300 of applying a pre-processed device configuration 112 to a new device instance 116. In step 302, a new device is detected as being connected to the computer. The specific mechanism by which a device is detected is not critical to the invention. Any suitable technique, including techniques that are known in the art, may be used to detect a device. In some embodiments, an input-output (I/O) driver, such as a driver for a bus or a hub, may monitor a physical connection for a device and alert the operating system of the device connection. Upon receiving notification of a connected device, the operating system may obtain information about the device, such as a model number, device ID, or other identifying information, by querying the I/O driver to which the device is connected. The operating system may also obtain other information about the device, such as drivers which have registered for notification on the device.

In decision block 304, if the device has already been installed on the computer, then the operating system may use an existing device instance 116 for the device. In that scenario, the device instance may already include configuration information. However, if the device is not yet installed, then the operating system may install the device. In some embodiments, the operating system may first attempt to find a pre-processed device configuration 112 that it may readily copy to the new device instance. In some embodiments, the operating system may attempt to find this pre-configured driver information in step 306 by searching a device configuration database, such as the database 110 in FIG. 1. Such a search may be conducted in any suitable way. In embodiments in which an index of drivers or driver packages that have been pre-processed is created, searching the data base may entail checking such an index or other information.

This database 110 may store driver information for one or more devices that may connect to the computer. In some embodiments, the device configuration database 110 may contain at least two types of information. A first type of information may comprise settings and configurations that are consumable by multiple different related drivers. The second type of information may be pre-processed configuration data relative to the specific device being installed. This device-relative information may be pre-computed in the form of a template, such that when a device is detected, the operating system may apply the template settings without having to load and parse the entire driver information.

In some embodiments, the driver information stored in the device configuration database 110 may comprise pre-processed device configurations 112, which may be indexed in the database 110 by an associated driver package 102, or any suitable information that allows matching of pre-processed device configurations 112 with detected devices. In some embodiments, the template format of the pre-processed device configuration 112 may allow its contents to simply be copied into a new device instance 116 when installing a device. The driver package 102 may have a set of device identifiers, corresponding to devices for which a driver in the driver package 102 may be applied.

If a pre-processed device configuration 112 corresponding to the device instance 116 is found in the database 110, then in decision block 308, the operating system may subsequently proceed to retrieve and apply the pre-processed device configuration 112 to the device instance 116, as shown in step 310, to complete the installation of the device. In some embodiments, applying the pre-processed device configuration 112 to the device instance 116 may involve simply copying device and driver settings from the database 110 to the device instance 116.

Once the device instance 116 has been configured, the operating system may attempt to start the device for use in step 312. The device may be started in any suitable way, including using techniques as are known in the art. In some embodiments, starting the device may trigger execution of software that is already loaded into memory as part of the pre-configuration process. Though, the process of starting the device instance 116 may comprise, in some embodiments, the loading of binary files from their run-time locations, if they have not already been loaded in the pre-processed device configuration 112.

Alternatively, if the result of decision block 308 is that no applicable pre-processed device configuration 112 is found in the device configuration database 110, then in step 314, the operating system may attempt to search for an applicable driver information, such as driver package 102, for the device and perform device pre-configuration. In some embodiments, this may comprise a pre-configuration process 100 that may generate a pre-processed device configuration based on the driver information and store the device configuration in the device configuration database 110, after which step 306 may be performed to re-attempt configuring the device instance 116.

The device pre-configuration process 100 may comprise various components that are partially implemented in user-mode of the computer that is to be pre-configured. However, in some embodiments, these or other components that can perform pre-configuration, may all be operable in an offline mode. Such off-line components may operate in the same computer that is to be pre-configured or even in a separate computer from which pre-configuration will be transferred to another computer. Such a capability may allow for parties other than an end-user of a computer to pre-configure the computer. For example, a computer manufacturer may pre-process driver configuration information or otherwise generate information to populate a device configuration database.

In general, there may be several appropriate sources for driver information that may be used during a device pre-configuration process. While driver package 102 may be one source of generating device configurations 112, driver information may be provisioned from different sources and not all at once. For example, pre-processed device configuration 112 may be generated based on information received from various sources, and not necessarily by the pre-processing module 104, using any suitable mechanism to populate the database 110 with pre-processed device configuration 112.

In some embodiments, pre-processing of driver information may happen outside of the operating system of the computer to which the device may connect. For example, the pre-processing may be done on an entirely different computing system as part of the driver packaging process. In such cases, the driver package 102 may not be pre-processed on an operating system that the driver package 102 is deployed to. For example, in some embodiments, device configurations may be pre-processed by driver vendors, who may provide a driver package 102 that stores pre-processed device configurations. In such scenarios, the pre-processing module 104 may index the pre-processed configuration from the driver package 102 directly into the database 110.

Figure 4:
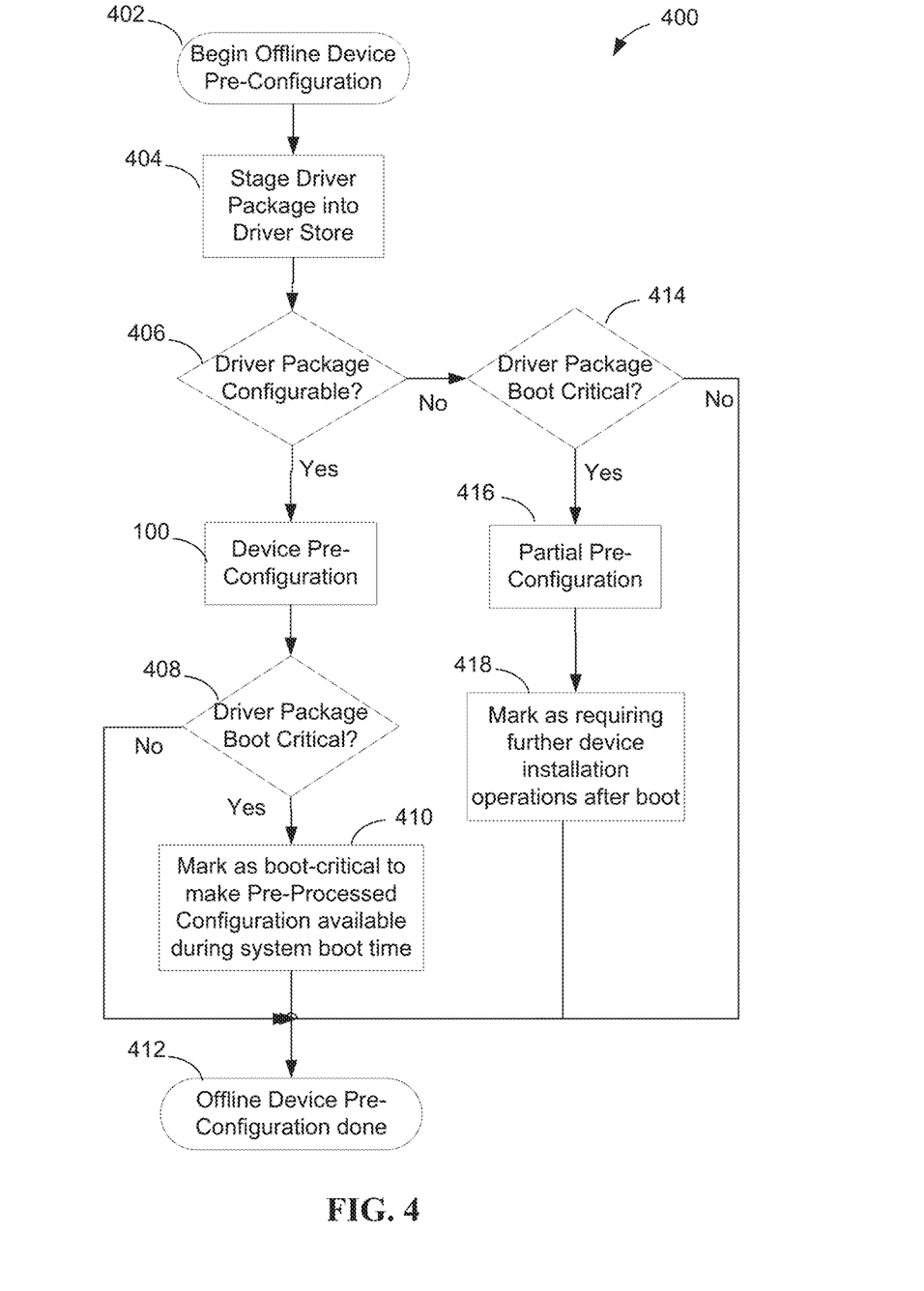
FIG. 4 is a flow chart of one possible embodiment of a method of offline pre-assembly and staging of driver information, such that the operating system may be deployed with pre-assembled device configuration data readily applicable to one or more associated devices.

FIG. 4 is a flow chart of one embodiment of a method of performing an offline device pre-configuration process 400. As illustrated, this offline pre-configuration process 400 may be performed, for example, during manufacture of a computer during which an operating system may be installed on a computer by an original equipment manufacturer (OEM). In some embodiments, this pre-configuration may involve one or more steps of the device pre-configuration process 100, except that the process 400 is done entirely offline, before the user begins using the computer.

Alternatively, in some embodiments, the offline pre-configuration method 400 may be used to generate an offline image of an operating system (OS), to be deployed to users who may install the image on computers. In such cases, since there may not be a physical computer in which to initialize settings or store information, the method 400 may be modified in any suitable way to instead store the pre-processed device configuration 112 in a memory location of the OS image. In some embodiments, when this OS image is loaded onto a computer, various steps of the pre-configuration process 100 may then be implemented, including storing the pre-processed device configuration 112 in a database 110. As such, when a user of a computer first loads the operating system image out of the box, there may be automatically provided one or more pre-processed device configurations 112 ready to be bound to applicable devices.

In some embodiments, the OEM may have the ability to pre-configure selected devices that are considered likely to connect with the computer. The OEM, for example, may have information about which devices are to be installed in the computer and a suitable driver for a particular device. In some embodiments, the selection of driver packages may be performed in such a way that only some are integrated into an operating system, for example, by selecting those driver packages which are commonly used or important to functionality of the operating system. The selection of which drivers to pre-configure may be made to improve the experience for an end user of the computer.

In step 402, a server or other device controlling offline pre-configuration may obtain a driver package 102 to include in the operating system. In some embodiments, this driver package 102 may be staged, or stored, in step 404 into a memory location of the offline operating system image. The memory location may be, for example, a repository of driver packages that may be installed for devices connecting with the computer. Such a repository may be implemented in a variety of suitable ways, either by the OEM or by third-party driver vendors.

In decision block 406, the configurability of the driver package 102 may be determined, for example, by querying the driver package 102 for status information. A driver package may be deemed not configurable by using various criteria, depending on the specific actions of the device pre-configuration process. In some embodiments, a driver package may be deemed not configurable if, for example, it contains instructions that alter system settings or states that cannot be configured ahead of time by information stored in an image.

If the driver package configuration is deemed configurable, then the driver package 102 may undergo the device pre-configuration process 100. Though, it should be appreciated that in the context of FIG. 4, the result of pre-configuration may be information stored in an image of the operating system that is to be loaded onto a computer, rather than generation of information that is directly stored in memory locations in the executing computer. As a result, there may be provided after process 100 a pre-processed device configuration 112, which will appear in a database, such as database 110, when the operating system image is loaded. In some embodiments of computer manufacturing, the driver package also may be included in the image, ready to be applied when the user first connects an applicable device to the computer.

Alternatively or additionally, in some embodiments, the driver package may be staged in an image of the operating system, which may be deployed to users to install on various computers. In such embodiments, the pre-processed configurations may be loaded onto the operating system image such that when the operating system image is loaded onto a computer, the pre-processed device configuration 112 is automatically stored in a database, such as database 110, ready to be applied when an applicable device subsequently connects to the computer.

In some embodiments, as in step 408, a determination may be made whether the driver package 102 is boot-critical. This determination may be made in any suitable way, which may be manual or automated. Regardless of how the determination is made, if the driver package is boot-critical, then in step 410, the pre-processed device configuration 112 may be marked as being boot-critical, so that it may be available during system boot time and applied to the appropriate device whenever the system is booted. Devices which are deemed boot-critical may include, for example, devices which are essential to loading the operating system, such as storage or system devices. As such, the most critical devices, among others, may benefit from having a readily-available pre-processed device configuration 112 at all times.

Alternatively, if the driver package 102 is deemed not boot critical in step 408, then the offline pre-configuration process may end in step 412. In such cases, the pre-processed device configuration 112 may not be applied to the device upon every boot, instead only being applied when a user first connects an applicable device for that pre-processed device configuration 112. In some embodiments, a device that is deemed not boot critical may allow the corresponding device configuration to be excluded from the available device configurations during system boot time. This may reduce the overhead of data required by the operating system in order to boot, which may lead to faster boot times.

If, however, in decision block 406, the driver package 102 is not considered to be configurable, then in some embodiments, in decision block 414, it may be determined whether the driver package 102 is boot-critical. If so, then the driver package 102 may be processed, as in step 416, for partial pre-configuration, as is known in the art. Such partial pre-configuration may include, for example, only a portion of the full device pre-configuration 100, and therefore may require further device installation processing before the full functionality of the device is exposed. As such, in step 418, the device instance 116 may further be marked as requiring further device installation processing, which may occur, for example, in user-mode after booting the system. This may ensure that any device instances 116 with incomplete configurations are eventually fully configured by device installation as expected.

Otherwise, if the driver package is deemed neither to be configurable in decision block 404 nor boot-critical in decision block 414, then the offline device pre-configuration process may end in step 412, with such driver packages requiring full installation upon first connection of an applicable device. Regardless of the exact steps involved in the foregoing offline pre-configuration of devices, the offline pre-configuration method 400 may result in a manufactured computer that has any number of selected OEM driver packages pre-configured in order to ensure that the operating system is able to successfully boot with some of those pre-configured driver packages ready to be applied to one or more devices.

Figure 5:
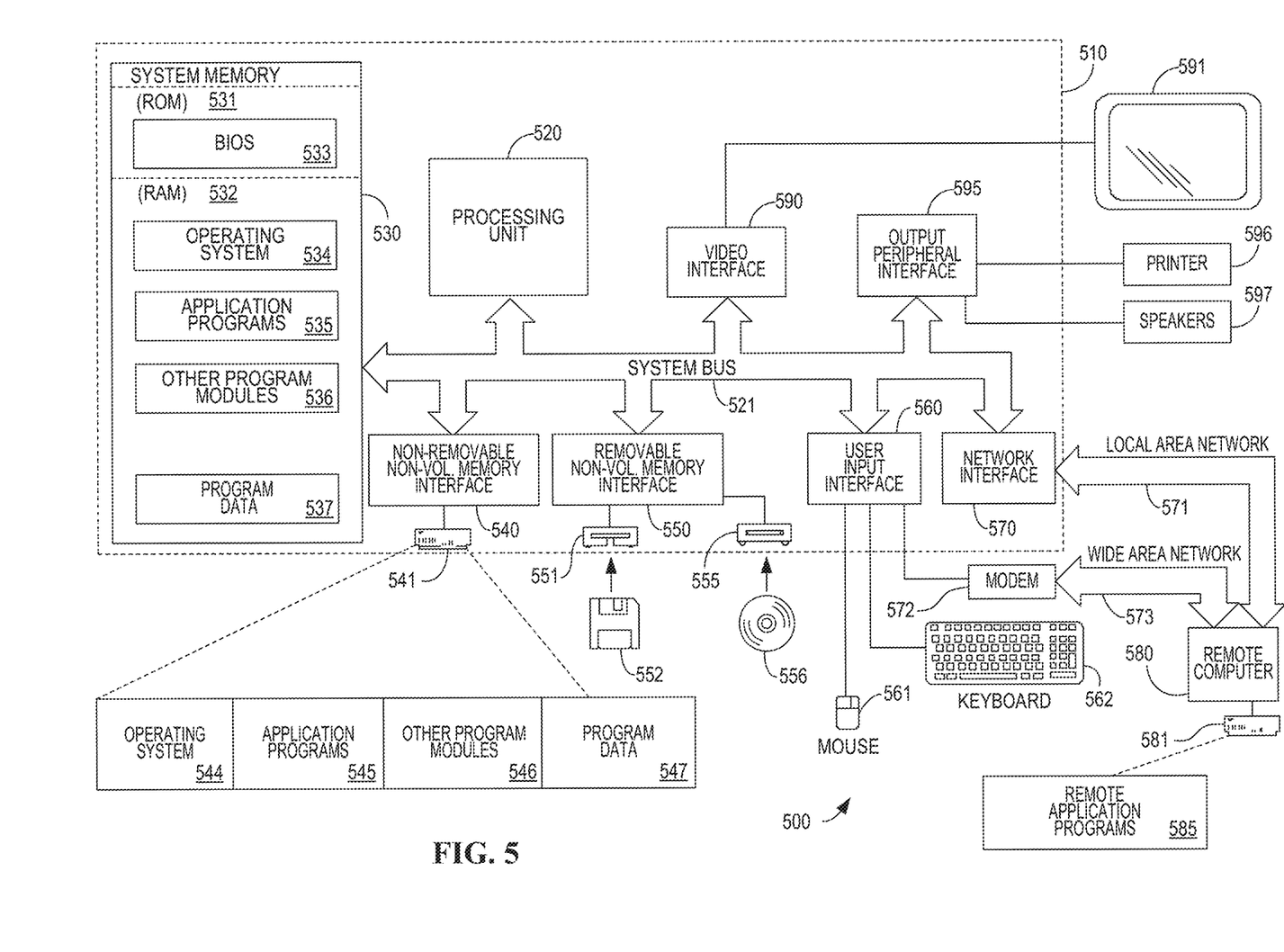
FIG. 5 is a schematic illustration of a representative computing environment on which embodiments of the invention may operate.

FIG. 5 illustrates an example of a suitable computing environment 500 on which the invention may be implemented. This computing environment may be representative of computer 510 that interoperates with various devices, such as a mouse 561, a keyboard 562, a monitor 591, a printer 596, and other devices shown in FIG. 5. However, it should be appreciated that the computing environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing environments or configurations. Examples of well known computing environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device, comprising:
a memory;
a processor, wherein the memory and the processor are respectively configured to store and execute instructions for causing the computing device to perform operations, the operations including:
creating a pre-processed device configuration, including:
detecting, by the computing device, a driver package that is new to the computing device and a lack of a pre-processed device configuration corresponding to the driver package;
installing, by the computing device, a service state for a device driver of the driver package and pre-instance configuration settings for the device driver and a corresponding device; and
pre-registering interfaces for the corresponding device; and
storing, by the computing device in a data store, the created pre-processed device configuration.

2. The computing device of claim 1, wherein the operations further comprise:
determining whether the driver package is configurable.

3. The computing device of claim 2, wherein the created pre-processed device configuration is created in response to a determination that the driver package is not configurable, and in response to a determination that the driver package is boot-critical.

4. The computing device of claim 1, wherein the operations further comprise:
staging the created pre-processed device configuration in an image of an operating system.

5. The computing device of claim 1, wherein the operations further comprise:
marking the created pre-processed device configuration as boot-critical.

6. The computing device of claim 5, wherein the boot-critical created pre-processed device configuration is configured for being applied to the corresponding device during boot time of a host system.

7. The computing device of claim 1, wherein the installing includes pre-copying binary files of the driver package to their run-time locations.

8. The computing device of claim 1, wherein the operations further comprise:
pre-installing function driver services.

9. The computing device of claim 1, wherein the operations further comprise:
pre-installing filter driver services.

10. The computing device of claim 1, wherein the created pre-processed device configuration is stored in a device configuration database.

11. The computing device of claim 1, wherein the operations further comprise:
obtaining the driver package for the corresponding device.

12. A computing device, comprising:
a memory;
a processor, wherein the memory and the processor are respectively configured to store and execute instructions for causing the computing device to perform operations, the operations including:
obtaining, by the computing device, a driver package;
staging, by the computing device, the obtained driver package in an offline operating system image;
generating, by the computing device, a pre-processed device configuration that corresponds to the obtained driver package; and
storing, by the computing device in the offline operating system image, the generated pre-processed device configuration.

13. The computing device of claim 12, wherein the operations further comprise:
determining whether the driver package is configurable.

14. The computing device of claim 13, wherein the created pre-processed device configuration is created in response to a determination that the driver package is not configurable, and in response to a determination that the driver package is boot-critical.

15. The computing device of claim 12, wherein the operations further comprise:
marking the created pre-processed device configuration as boot-critical.

16. A method performed on a computing device, the method comprising:
creating a pre-processed device configuration, including:
detecting, by the computing device, a driver package that is new to the computing device and a lack of a pre-processed device configuration corresponding to the driver package;
installing, by the computing device, a service state for a device driver of the driver package and pre-instance configuration settings for the device driver and a corresponding device; and
pre-registering interfaces for the corresponding device; and
storing, by the computing device in a data store, the created pre-processed device configuration.

17. The method of claim 16, further comprising:
determining whether the driver package is configurable, wherein the created pre-processed device configuration is created in response to a determination that the driver package is not configurable, and in response to a determination that the driver package is boot-critical.

18. The method of claim 16, further comprising:
marking the created pre-processed device configuration as boot-critical.

19. The method of claim 16, further comprising:
staging the created pre-processed device configuration in an image of an operating system.

20. The method of claim 16, wherein the installing includes pre-copying binary files of the driver package to run-time locations.

* * * * *